June 13, 1950 E. W. LARGENT 2,511,352
VARIABLE RECIPROCATORY MOTION MEANS
Filed April 10, 1944 2 Sheets-Sheet 1

INVENTOR.
E. W. LARGENT.
BY
Martin P. Smith,
ATTY.

June 13, 1950   E. W. LARGENT   2,511,352
VARIABLE RECIPROCATORY MOTION MEANS
Filed April 10, 1944   2 Sheets-Sheet 2
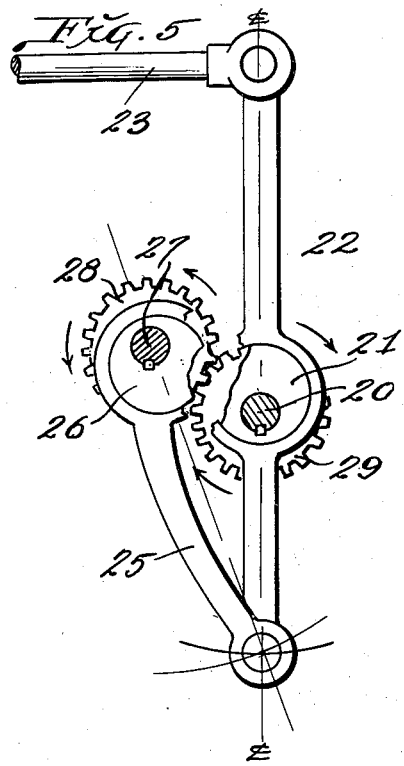
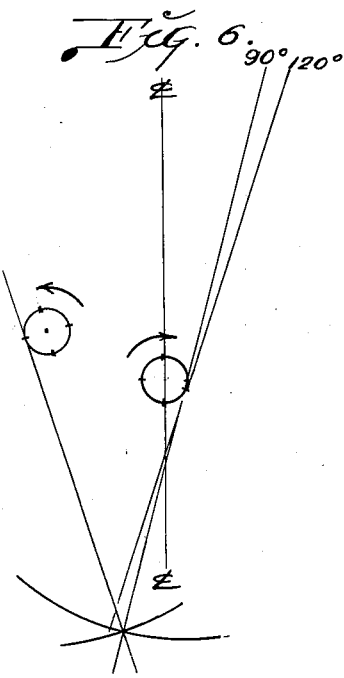
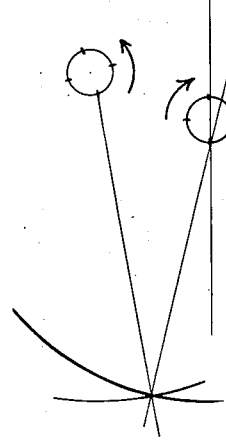
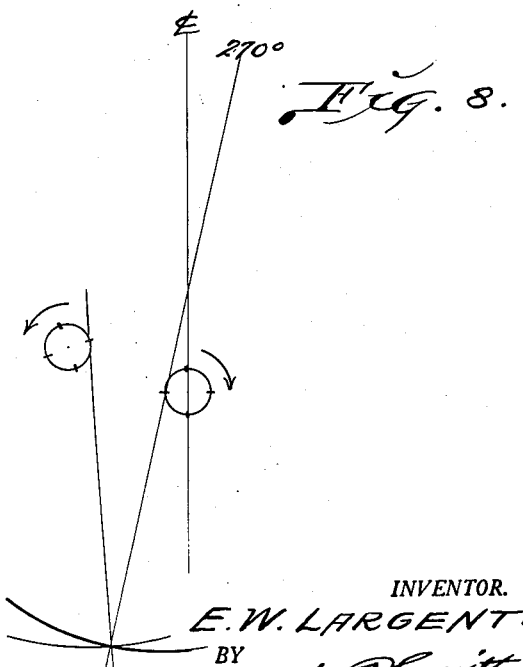
INVENTOR.
E. W. LARGENT.
BY Martin P. Smith
ATTY.

Patented June 13, 1950

2,511,352

UNITED STATES PATENT OFFICE 2,511,352

VARIABLE RECIPROCATORY MOTION MEANS

Edward W. Largent, Los Angeles, Calif., assignor of one-half to Perez E. Babcock, Los Angeles, Calif.

Application April 10, 1944, Serial No. 530,268

4 Claims. (Cl. 74—26)

My invention relates to a method of and a simple mechanical arrangement or means for converting uniform or constant speed rotary motion into variable reciprocating motion and which latter may be used for various purposes, for instance, the reciprocation of ore concentration tables, shaker screens, reciprocating conveyors and the like, and one of the principal objects of my invention is, to provide a motion converting arrangement which is simple and compact in structure, composed of few parts, inexpensive of manufacture and operation, and particularly efficient in use.

A further object of my invention is, to provide a motion converting device of the character referred to, which will develop variable reciprocating motion so that the driven or actuated element, such as a table or screen, will be moved faster in one direction, than in the other thus causing the material on the screen or table, to travel with an intermittent movement in the direction in which said screen or table moves at slowest speed.

A further object of my invention is to provide a simple, effective economical and easily practiced method for causing crushed, pulverized, or granular material and particularly, material having particles of different specific gravities, to move over a supporting surface, such as a concentration table, either wet or dry, a shaker screen, a conveyor or the like, with an intermittent movement in order to effect a comparatively rapid, high percentage separation of the particles of different specific gravities.

With the foregoing and other objects in view, my invention consists in certain novel features of construction and arrangement of parts, which will be hereinafter more fully described and claimed and illustrated in the accompanying drawings, in which:

Fig. 5 is an elevational view of a modified form of the apparatus.

Figs. 6, 7 and 8 are diagrammatic views showing the different positions of the lever during one complete rotation of the driving shaft and eccentric used in the modified structure.

Referring by numerals to the accompanying drawings and particularly the structure illustrated in Figs. 1 to 4 inclusive, 10 designates a suitably driven shaft, 11 the axis thereof, 12 an eccentric carried by said shaft, which eccentric is journalled for rotation in the intermediate portion of a lever 13.

One end of this lever, preferably the upper end, is suitably connected, as by a rod or link 14 to the table, screen or other member which is to be reciprocated, in order to cause the material or product acted upon to travel thereover.

Figure 1:
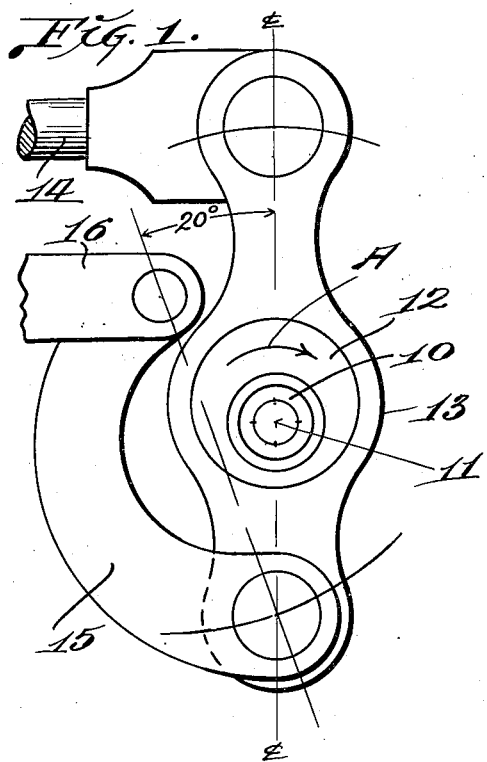
Fig. 1 is an elevational view of motion converting device constructed in accordance with my invention.
Figure 2:
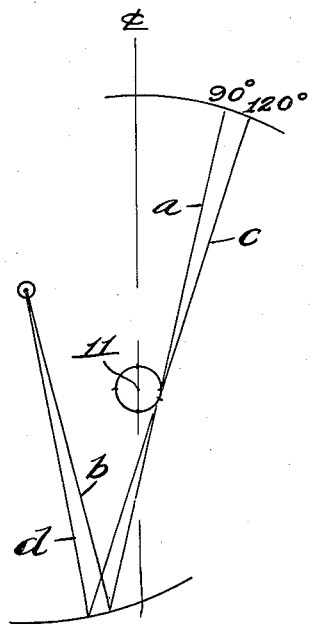
Figs. 2, 3 and 4 are diagrammatic views illustrating different positions of the lever during one complete rotation of the driving shaft and eccentric.

The opposite end of lever 13 is pivotally connected to a link 15 and the opposite end of the latter is pivotally connected to a fixed support 16. As illustrated in Fig. 1, when lever 13 is in a vertical position with the center of the eccentric 12 in the same vertical plane with the axes between said lever and rod 14, the center line of the lever may occupy an angular position of approximately twenty degrees from the plane intersecting the axes of the pivotal connections between link 15 and rod 14 and link 15 and lever 13.

Shaft 10 rotates in the direction indicated by arrow A in Fig. 1, and when said shaft and eccentric carried thereby have made a quarter turn, or ninety degrees, lever 13 and link 15 will occupy the positions as indicated by the lines $a$ and $b$ respectively, and at 120 degrees rotation of the shaft said lever and link will occupy the positions as indicated by $c$ and $d$ respectively, this being the limit of movement in one direction of said lever.

Thus, the table is drawn rearward during 120 degrees of rotation of the shaft from its normal vertical position and during the remaining portion of rotation of said shaft, or 240 degrees, the lever will be returning to its vertical or zero position, and although the speed of rotation of the shaft is constant, the table will move considerably slower during its forward movement than during rearward movement, which result is due to the employment of the eccentric 12 and link 15.

Figure 3:
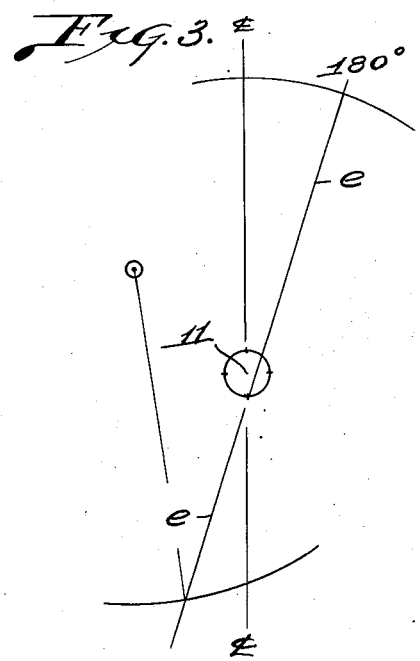
Figure 4:
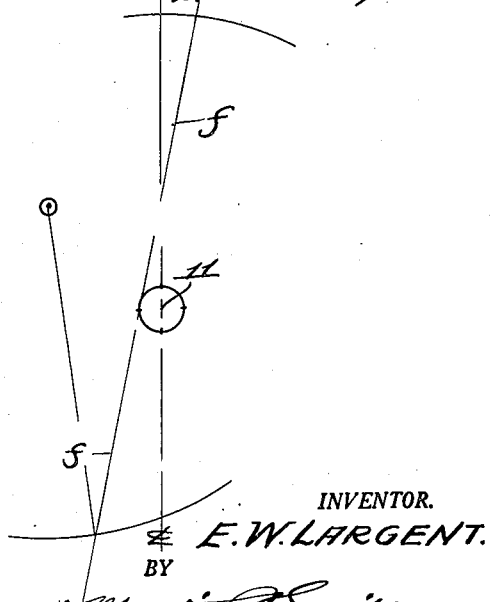

In Fig. 3 line $e$ indicates the angular position of lever 13 at 180 degrees rotation of the shaft and eccentric and in Fig. 4, line $f$ indicates the position of said lever at 270 degrees rotation of said shaft.

Thus the member to which rod 14 is connected will be moved forward a predetermined distance at a slow speed and then rearwardly the same distance at faster speed, thus accomplishing the desired results.

In my improved apparatus and method for the recovery of metallic valves from crushed ore, the acceleration of the movements of the table on the return or rearward stroke, materially increases volume recoveries as compared to conventional methods, as such movement lends itself to and enhances the separating action of the particles of material due to their different specific gravities.

In the treatment of average ores, or for the operation of screens and conveyors excellent results may be attained by operating the table or screen at about two hundred and thirty (230) more or less, strokes per minute, with a stroke travel of from ⅝ to 1 and ¼ inches.

In Figs. 5 to 8 inclusive, I have illustrated a modified arrangement utilizing two eccentrics and which is effective in increasing the angular throw or travel of the lever which is connected to and reciprocates the table or other element.

In this construction a power driven shaft 20 carries an eccentric 21 and mounted on the latter is a lever 22 which is connected by rod 23 to a table or screen or conveyor.

The lower end of lever 22 is pivotally connected to the lower end of a link 25 and the opposite end of the latter is journalled on an eccentric 26 carried by shaft 27, which also carries a pinion 28.

Shafts 20 and 27, which are parallel and occupy angular planes approximately 20 degrees apart, operate in suitable bearing (not shown) and pinion 28 meshes with a pinion 29 carried by shaft 20, and said pinions being the same in size.

When eccentric 21 is driven clockwise the upper end of lever will be swung toward the right hand and pinion 28, shaft 27 and eccentric 26, will be driven anti-clockwise so as to swing the upper end of link 25 toward lever 22. Thus, after 90 degrees movement the eccentrics 21 and 26 lever 22 and link will occupy the positions as diagrammatically illustrated in Fig. 6.

At 180 degrees travel the parts just mentioned will occupy the position as seen in Fig. 7 and at 270 degrees travel said parts will be positioned as seen in Fig. 8, and thus the angular throw of the lever connected to the table, screen or conveyor will be increased, with the speed of the reciprocated member greater on its rearward movement than on the forward movement.

My improved method of imparting variable reciprocatory movement to a table, screen, conveyor, or the like, materially increases production, due to the fact that a much greater volume of material can be handled within a given period of time, than by conventional methods now in use and further, the simplicity and compactness of the motion producing means, is especially advantageous.

Thus it will be seen that I have provided a variable reciprocatory motion means which is simple in structure, inexpensive of manufacture, and very effective in performing the functions for which it is intended.

It will be understood that minor changes in the size, form and construction of the various parts of my improved variable reciprocatory motion means may be made and substituted for those herein shown and described without departing from the spirit of my invention the scope of which is set forth in the appended claims.

I claim as my invention:

1. A variable reciprocatory motion means comprising an eccentric adapted for constant complete rotary motion, a lever fulcrumed on said eccentric and a rigid link pivotally connected at one end to a fixed support above and to one side of the axis of said eccentric and at its opposite end to said lever.

2. The combination with a member adapted to be reciprocated, of a lever, a connection between one end of said lever and said member, an eccentric fulcrum for said lever which eccentric is adapted for complete rotary motion at constant speed and a rigid link having one end pivotally connected to said lever and the other end pivotally connected to a fixed support disposed between and to one side of the point of pivotal connection between said lever and said link and the axis of said eccentric.

3. The combination as set forth in claim 2 including means for rotating said eccentric.

4. The combination with a member to be reciprocated, of a lever having one end connected to said member, an eccentric fulcrum for said lever means for imparting constant complete rotary motion to said eccentric fulcrum and a rigid link pivotally mounted at one end to a fixed support to form a swinging pivotal support for the other end of said lever.

EDWARD W. LARGENT.

REFERENCES CITED

The following references are of record in the file of this patent:

UNITED STATES PATENTS

| Number | Name | Date |
|---|---|---|
| 730,537 | Hofmann | June 9, 1903 |
| 822,629 | Phillips | June 5, 1906 |
| 1,078,900 | Burpee et al. | Nov. 18, 1913 |
| 1,579,170 | Wilkinson et al. | Mar. 30, 1926 |
| 2,070,941 | Dust | Feb. 16, 1937 |

FOREIGN PATENTS

| Number | Country | Date |
|---|---|---|
| 4,457 | Great Britain | 1893 |
| 4,964 | Great Britain | 1880 |
| 245,419 | Great Britain | Apr. 1, 1926 |
| 399,269 | Germany | July 29, 1924 |
| 618,473 | France | Mar. 10, 1927 |